US007050811B2

(12) United States Patent
Grech et al.

(10) Patent No.: US 7,050,811 B2
(45) Date of Patent: May 23, 2006

(54) METHOD OF SETTING UP AN APPLICATION INITIATED CALL TO A MOBILE STATION WITHIN A CAMEL NETWORK, AND A TELECOMMUNICATIONS SYSTEM COMPRISING A CAMEL NETWORK

(75) Inventors: Michel Louis Francis Grech, Pewsey (GB); Musa Unmehopa, Amersfoort (NL)

(73) Assignee: Lucent Technologies Inc., Murray Hill, NJ (US)

( * ) Notice: Subject to any disclaimer, the term of this patent is extended or adjusted under 35 U.S.C. 154(b) by 280 days.

(21) Appl. No.: 10/633,895

(22) Filed: Aug. 4, 2003

(65) Prior Publication Data

US 2004/0067781 A1    Apr. 8, 2004

(30) Foreign Application Priority Data

Aug. 7, 2002 (EP) .................................. 02255512

(51) Int. Cl.
*H04Q 7/20* (2006.01)
(52) U.S. Cl. ...................... 455/445; 455/418; 455/433; 455/567
(58) Field of Classification Search ................ 455/428, 455/422.1, 424–425, 432.1–433, 445, 458, 455/461, 417–420, 560, 567; 370/244, 338, 370/386; 379/142.07, 221.09, 373.01
See application file for complete search history.

(56) References Cited

U.S. PATENT DOCUMENTS

| | | | |
|---|---|---|---|
| 6,539,219 B1 * | 3/2003 | Gallant et al. ............... | 455/416 |
| 6,654,606 B1 * | 11/2003 | Foti et al. .................... | 455/445 |
| 6,731,937 B1 * | 5/2004 | Spinner ....................... | 455/445 |
| 6,871,070 B1 * | 3/2005 | Ejzak ........................... | 455/445 |
| 6,885,861 B1 * | 4/2005 | Koskelainen ................. | 455/433 |
| 2001/0027100 A1 * | 10/2001 | Immonen et al. ............ | 455/445 |
| 2002/0026473 A1 * | 2/2002 | Gourraud .................... | 709/203 |
| 2002/0090950 A1 * | 7/2002 | Uskela ......................... | 455/517 |
| 2003/0095566 A1 * | 5/2003 | Bunting et al. ............. | 370/338 |
| 2004/0028031 A1 * | 2/2004 | Valin et al. ................. | 370/352 |
| 2004/0028204 A1 * | 2/2004 | Crook .................... | 379/211.01 |
| 2004/0028214 A1 * | 2/2004 | Laanti .................... | 379/266.06 |
| 2004/0037407 A1 * | 2/2004 | Gourraud et al. ....... | 379/202.01 |
| 2004/0067753 A1 * | 4/2004 | Berg et al. ................ | 455/435.1 |
| 2004/0072555 A1 * | 4/2004 | Grech et al. ................ | 455/418 |
| 2004/0125755 A1 * | 7/2004 | Roberts ....................... | 370/259 |
| 2005/0094796 A1 * | 5/2005 | Beauford ................ | 379/211.01 |
| 2005/0117726 A1 * | 6/2005 | DeMent et al. ......... | 379/142.01 |

OTHER PUBLICATIONS

Grech, M. L. F. et al: "Delivering Seamless Services in Open Networks Using Intelligent Service Mediation" Bell Labs Technology, Bell Laboratories, Murray Hill, NJ, US, vol. 5, No. 3, (Jul. 2000), pp. 186-202, XP000975491 ISSN: 1089-7089.

3$^{rd}$ Generation Partnership Project; Completion of Calls to Busy Subscribers (CCBS)—Stage 3, Release 4; 3GPP TS 24.093 version 4.0 0 XP002226438.

* cited by examiner

*Primary Examiner*—Joseph Feild
*Assistant Examiner*—Kamaran Afshar (57) ABSTRACT

A method is provided of setting up a call connection to a mobile station operative to communicate with a Customised Application for Mobile Enhanced Logic (CAMEL) telecommunications network. The call is initiated by an Open Service Architecture (OSA) application, which causes a message to be produced which indicates to the network that the mobile station is now available to make a ring back call connection. The network setting up the call connection in response to the message.

11 Claims, 6 Drawing Sheets

FIG. 1 (Prior Art)
CCBS Functionality

FIG. 2

FIG. 4
routeReq() method definition

| <<Interface>><br>IpCall |
|---|
| |
| routeReq (callSessionID : in TpSessionID, responseRequested : in TpCallReportRequestSet, targetAddress : in TpAddress, originatingAddress : in TpAddress, originalDestinationAddress : in TpAddress, redirectingAddress : in TpAddress, appInfo : in TpCallAppInfoSet) : TpSessionID |

FIG. 5
routeRes() method definition

| <<Interface>><br>IpAppCall |
|---|
| |
| routeRes (callSessionID : in TpSessionID, eventReport : in TpCallReport, callLegSessionID : in TpSessionID) : void |

FIG. 6(Contd.)

METHOD OF SETTING UP AN APPLICATION INITIATED CALL TO A MOBILE STATION WITHIN A CAMEL NETWORK, AND A TELECOMMUNICATIONS SYSTEM COMPRISING A CAMEL NETWORK

CROSS REFERENCE TO RELATED APPLICATION

This application claims priority of European Application No. 02255512.2 filed on Aug. 7, 2002.

TECHNICAL FIELD

The present invention relates to a method of setting up a call connection to a mobile station operative to communicate with a Customised Application for Mobile Enhanced Logic CAMEL telecommunications network, and to a wireless telecommunications system comprising a CAMEL network.

BACKGROUND OF THE INVENTION

It is known that, in wireless networks, an Open Service Architecture (OSA) Call Control service capability feature (SCF) provides for application-initiated calls. An application is an entity (usually software) that provides a service to a subscriber. As an example, in an alarm call indication, the user sets the time to be woken up and at the appropriate time, the application calls the user with a predetermined announcement. OSA application-initiated calls are provided by means of a method known as createCall( ) which occurs in the IpCallControlManager interface. In wireless networks supporting Customised Application for Mobile Enhanced Logic CAMEL phase 3 (or lower), the functionality for an application to initiate calls is not provided, as there is no 'Call Party Handling' feature as occurs in CAMEL phase 4, in particular no InitiateCallAttempt operation. Although this operation is known to be proposed in Intelligent Networks Capability Set 2 (IN CS-2) for the purpose of network-initiated calls, it will not be implemented in CAMEL networks until CAMEL Phase 4 (Release 5). Instead, in CAMEL phase 3 networks, the mechanism of service properties P_OPERATION_SET described in section 6.5.2 of Third Generation Partnership Project 3GPP technical specification TS 29.198-04 is used to inform the Open Service Architecture OSA client application of this lack of support in a CAMEL service environment CSE, during a service discovery phase.

CCBS (Call Completion to Busy Subscriber) Functionality

Figure 1:
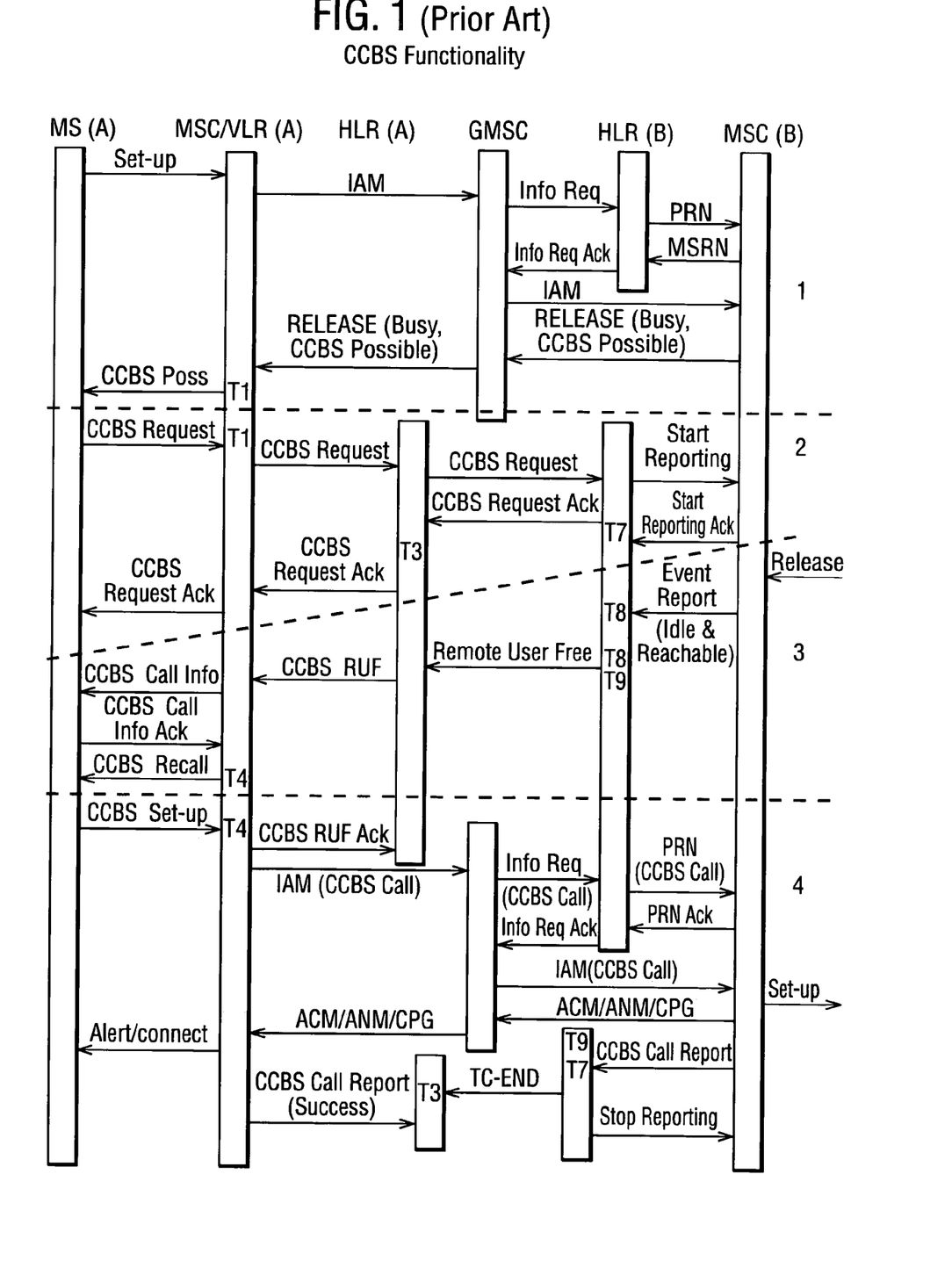
FIG. 1 is a diagram illustrating known CCBS (call completion to busy subscriber) functionality in telecommunications networks (prior art)

A general description of CCBS (call completion to busy subscriber) procedures, referring to FIG. 1, is as follows. As shown in FIG. 1, the CCBS (call completion to busy subscriber) service allows a calling subscriber A (mobile station MS-A), after finding that destination B (mobile station MS-B) is NDUB (Network Determined User Busy), to be notified of when destination B becomes idle (i.e available to receive the call). If subscriber A so desires, the network then automatically generates a CCBS (call completion to busy subscriber) call to destination B. This is often referred to as "ringback" and is as described in Third Generation Partnership Project 3GPP technical specification TS 23.093 CCBS (call completion to busy subscriber) Stage 3. When subscriber A receives a busy treatment (i.e message) from subscriber B, a prolonged call clearing procedure takes place whereby subscriber A invokes a CCBS (call completion to busy subscriber) Activation request. Among other things, this results in the original SETUP message used by subscriber A to setup a call to subscriber B being stored in the home location register (HLR) of subscriber A. As soon as the network detects that subscriber B is available again, the home location register (HLR) of subscriber B (HLR-B) notifies the home location register (HLR) of subscriber A (HLR-A) of this event. Home location register of subscriber A (HLR-A) then sends a mobileapplication part (MAP) Remote User Free (RUF) message (i.e a CCBS (call completion to busy subscriber) remote user free (RUF) message) to the switch (mobile switching centre (MSC)/visitor location register (VLR-A)), currently serving subscriber A. This remote user free (RUF) operation contains the original stored SETUP message. The mobile switching centre (MSC)/visitor location register VLR-A then starts a Network Initiated Mobile Originated (NIMO) process, in which over the radio signalling link, the original SETUP message is sent back to subscriber A (mobile station MS-A) in the CCBS (call completion to busy subscriber) Call Info message. By sending the CCBS (call completion to busy subscriber) Recall message to mobile station MS-A, the network (mobile switching centre (MSC)/visitor location register VLR-A) triggers the mobile station MS-A to initiate the CCBS (call completion to busy subscriber) recall. The original SETUP message is used to setup this CCBS (call completion to busy subscriber) recall to the previously busy subscriber B. Call processing proceeds from here on in a similar way as for normal call processing, i.e. an Initial Address Message (IAM) is sent to the Gateway mobile switching centre GMSC, etc. The home location register HLR-A is notified of the successful setup of the CCBS (call completion to busy subscriber) recall, by means of the CCBS (call completion to busy subscriber) Call Report message from mobile switching centre MSC/visitor location register VLR-A. The reader is referred to the CCBS (call completion to busy subscriber) specifications for a more elaborate background description, namely Third Generation Partnership Project 3GPP technical specifications TS 22.093, TS 23.093, and TS 24.093.

SUMMARY OF THE INVENTION

The present invention provides a method of setting up a call connection to a mobile station operative to communicate with a Customised Application for Mobile Enhanced Logic CAMEL telecommunications network, the call being initiated by an Open Service Architecture OSA application causing a message to be produced which indicates to the network that the mobile station is now available to make a ring back call connection, the network setting up the call connection in response to the message.

In preferred embodiments, a mechanism is thus provided to support Open Service Architecture OSA application initiated calls in CAMEL phase 3 networks or in networks with lower CAMEL capability (e.g. CAMEL phase 2). The mechanism is preferably to support application-initiated calls by means of reusing the Completion of Calls to Busy Subscriber (CCBS) Remote User Free (RUF) procedure in the home location register (HLR) and the CCBS (call completion to busy subscriber) Network Initiated Mobile Originated (NIMO) process in the switch (mobile switching centre (MSC)/visitor location register (VLR)). These CCBS (call completion to busy subscriber) procedures allow the home location register (HLR) to instruct the switch to initiate a sequence whereby a call to a specified party is set up.

Preferably the message is a Completion of Calls to Busy Subscriber CCBS Remote User Free RUF message.

Preferably the network sets up the call connection using Completion of Calls to Busy Subscriber CCBS network-initiated mobile-originated NIMO procedures.

Preferably in the network comprising a home location register HLR of the mobile station and a visited mobile switching centre VMSC/visited location register VLR with which the mobile station is currently associated, the home location register HLR constructs the message, and instructs the visited mobile switching centre VMSC/visited location register VLR to make a Completion of Calls to Busy Subscriber CCBS Re-call so as to setup the call connection in response to the message. Furthermore preferably the home location register HLR constructs a SETUP message for use in call setup comprising call setup information. Furthermore preferably the SETUP message is constructed using parameters from routeReq methods for the mobile station.

The present invention also provides a method of controlling a call to a mobile station operative to communicate with a Customised Application for Mobile Enhanced Logic CAMEL telecommunications network comprising the above method of setting up the call connection, and the OSA application controlling the call connection after call connection setup.

In some preferred embodiments, a mechanism is thus also provided to support Open Service Architecture (OSA) application initiated calls in CAMEL phase 2 networks and phase 3 networks, with application control after call setup. Preferably use is made of the remote user free (RUF) and network initiated mobile originated (NIMO) procedures for setting up application initiated calls, and, in addition, make use of existing CAMEL procedures to perform subsequent control over the call.

Preferably the home location register HLR or visited mobile switching centre VMSC/visited location register VLR with which the mobile station is currently associated is provided with CAMEL subscription information CSI so as to enable said controlling the call connection after call connection setup.

Preferably the home location register updates the visited mobile switching centre VMSC/visited location register VLR with CAMEL subscription information CSI, in the absence of which pseudo—CAMEL subscription information CSI is sent instead which is deleted upon the call connection being set up.

Preferably the visited mobile switching centre VMSC/visited location register VLR is operative to check the CAMEL subscription information CSI or pseudo—CAMEL subscription information CSI and if the information is found acceptable an initial detection point InitialDP is sent to a call control server including an identifier that the OSA application may have control over the call connection. The call control server can be a service control point acting as an OSA Gateway.

Preferably the visited mobile switching centre VMSC/visited location register VLR responds to the message by sending to the call control server an acknowledgement including an identifier field which matches that in the initial detection point, the server being operative to check whether the two identifiers match and if so notify the OSA application of its control of the call connection after call connection setup.

Furthermore preferably the call control server enables notification to the OSA application of subsequent events in processing the call at the visited mobile switching centre VMSC/ visited location register VLR so as to enable call connection control operations by the OSA application.

The present invention also provides corresponding wireless telecommunication systems. For example, the present invention also provides a wireless telecommunications system comprising a Customised Application for Mobile Enhanced Logic CAMEL telecommunications network, and a mobile station, the network being operative to set up a call connection to the mobile station, the call being initiated by an Open Service Architecture OSA application causing a message to be produced which indicates to the network that the mobile station is now available to make a ring back call connection, the network being operative to set up the call connection in response to the message.

BRIEF DESCRIPTION OF THE DRAWINGS

Preferred embodiments of the present invention will now be described by way of example and with reference to the drawings, in which.

DETAILED DESCRIPTION

Two systems are described in turn below. The first involves using CCBS (call completion to busy subscriber) procedures for application initiated calls. The second additionally involves control by the application after call setup also.

Figure 2:
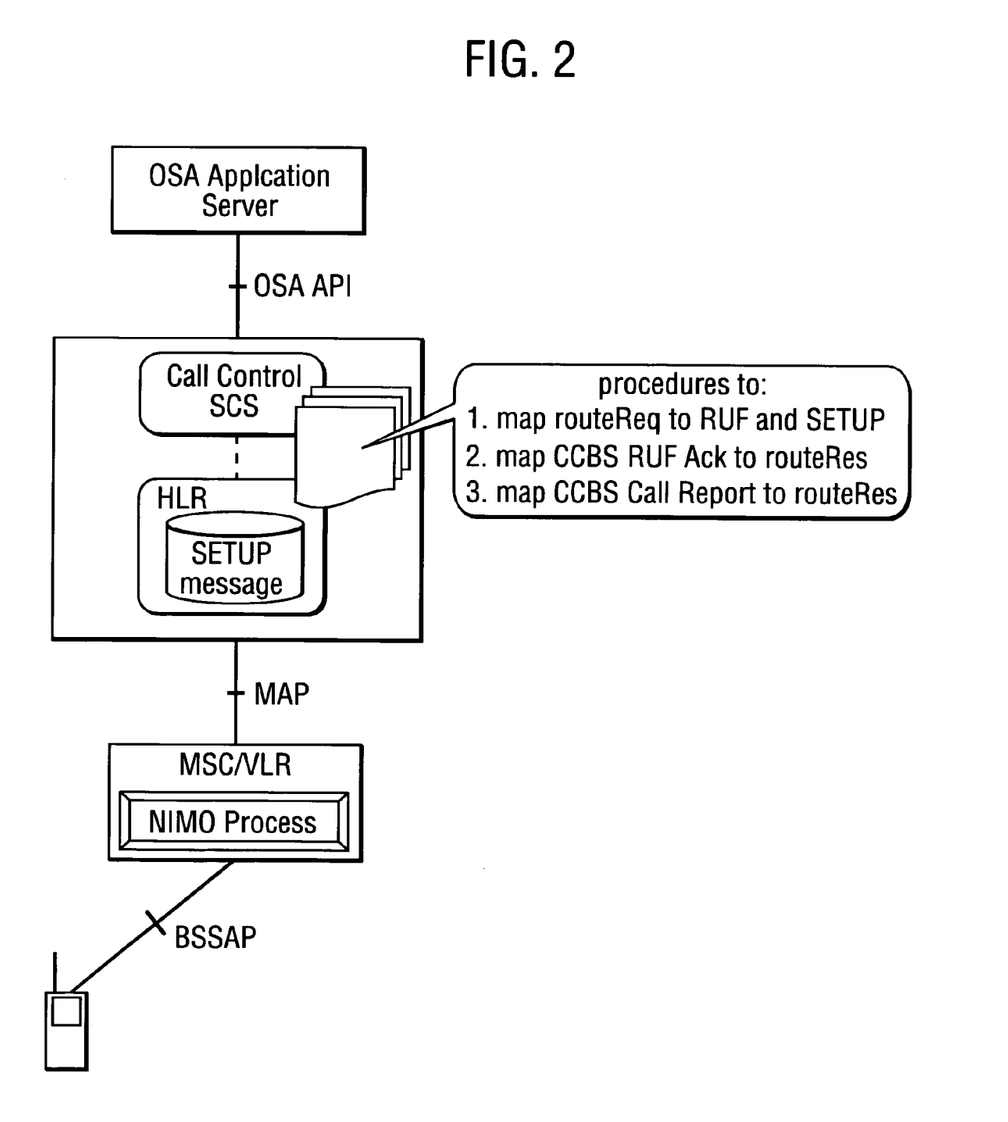
FIG. 2 is a diagram illustrating a network according to a first embodiment of the invention.

Using CCBS (Call Completion to Busy Subscriber) Procedures for Application Initiated Calls The basic idea presented in this section is to make use of the existing remote user free (RUF) and network initiated mobile originated (NIMO) procedures described above in order to support application initiated calls for the Open Service Architecture (OSA) createCall( ) application programming interface (API) method. As shown in FIG. 2, an interface is introduced between the Open Service Architecture (OSA) Call Control Service Capability Server (SCS) and the home location register (HLR), and createCall( ) and routeReq( ) methods (i.e messages) mapped onto the mobile application part (MAP) Remote User Free operation (i.e message) by the HLR. This requires processing on the home location register (HLR) in order to construct a SETUP message, telling the network that a CCBS (call completion to busy subscriber) target (subscriber B) is available, and instructing the network to setup a CCBS (call completion to busy subscriber) Recall, even though a CCBS (call completion to busy subscriber) activation request was not issued by subscriber A. The basic mechanism is depicted in FIG. 3.

Figure 3:
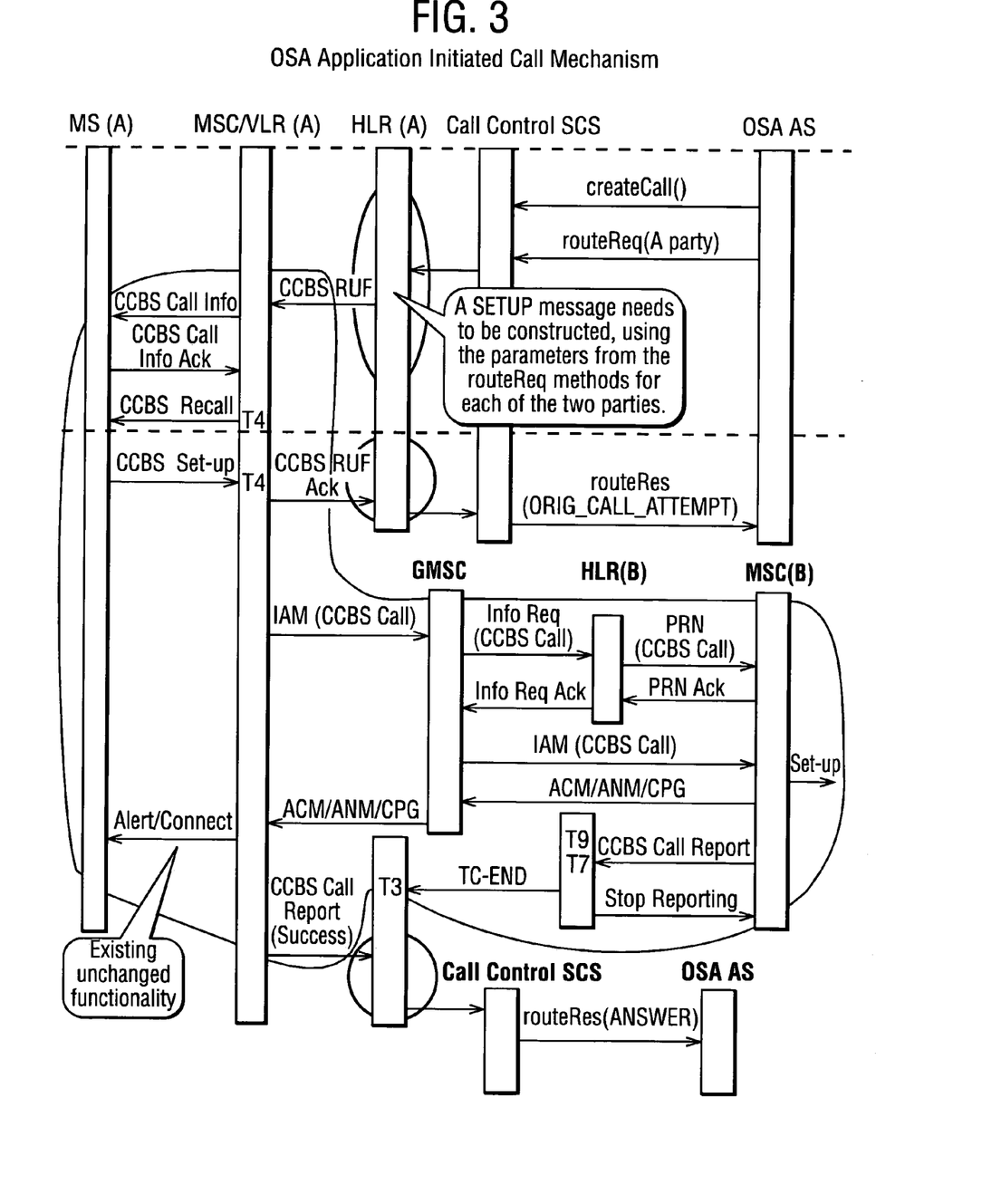
FIG. 3 is a diagram illustrating messaging in Open Service Architecture (OSA) application initiated call setup.

The mechanism depicted in FIG. 3 involves the home location register (HLR) to setup the call. It is however not possible for the home location register (HLR) to control the call. Therefore, after application initiated call setup, the application has no control over the call anymore, although it is still possible for the application to receive call event reports. Processes in the home location register (HLR) are required to:

(1) Perform a mapping (translation) from the "CCBS (call completion to busy subscriber) remote user free RUF Ack" mobile application part (MAP) operation (i.e message) to the routeRes( ) method (i.e message), with the CallReportType field of the responseRequested parameter of the routeRes( ) method set to P_CALL_REPORT_UNDEFINED. This may be interpreted as the CAMEL Event analyzedInformation, signalling an origination call attempt.

(2) Perform a mapping (i.e translation) from the "CCBS (call completion to busy subscriber) Call Report" mobile application part (MAP) operation to the routeRes( ) method, with the CallReportType field of the responseRequested parameter set to P_CALL_REPORT_ANSWER.

(3) Override the CCBS (call completion to busy subscriber) supplementary service settings for the subscriber. In the case that the subscriber is not provisioned with CCBS (call completion to busy subscriber), the home location register (HLR) overrides this. In the case that the subscriber is provisioned with CCBS (call completion to busy subscriber), no change in the subscription data for this particular subscriber is required.

DETAILED DESCRIPTION OF THE MAPPINGS

Figure 4:
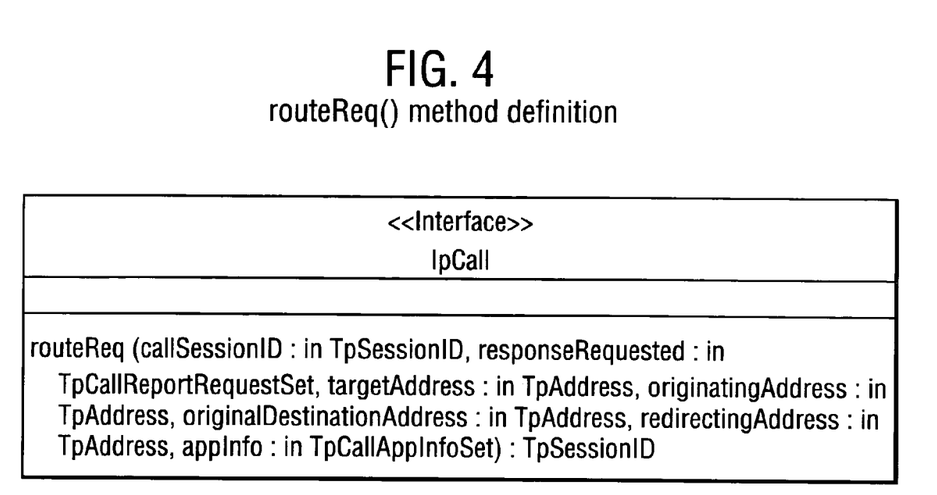
FIG. 4 is a diagram illustrating routeReq( ) structure.

The CCBS (call completion to busy subscriber) SETUP Container information element is defined in Third Generation Partnership Project 3GPP technical specification TS 24.008. The routeReq( ) method and the data types of the parameters within it are defined in Third Generation Partnership Project 3GPP technical specification TS 29.198-04, and are as shown in FIG. 4.

The following table, namely Table 1, shows the mapping from the Open Service Architecture OSA application programming interface (API) method routeReq( ) parameters and data types in order to populate the SETUP message to be sent in the mobile application part (MAP) remote user free (RUF) operation. The SETUP message data fields for which no mappings exist are populated with default values.

TABLE 1

Open Service Architecture (OSA) routeReq( ) to SETUP Mapping

| SETUP Information Element | routeReq( ) Method |
|---|---|
| Call control Protocol discriminator | No mapping |
| Transaction identifier | No mapping |
| Setup Message type | No mapping |
| BC repeat indicator | |
| Bearer capability 1 | appInfo (TpCallAppInfo) CallAppBearerService (TpCallBearerService) |
| Bearer capability 2 | appInfo (TpCallAppInfo) CallAppBearerService (TpCallBearerService) |
| Facility | No mapping |
| Progress indicator | No mapping |
| Signal | No mapping |
| Calling party BCD Number | originatingAddress |
| Calling party sub- Address | originatingAddress (TpAddress) SubAddressString |
| Called party BCD Number | originalDestinationAddress |
| Called party sub- Address | originalDestinationAddress (TpAddress) SubAddressString |

TABLE 1-continued

Open Service Architecture (OSA) routeReq( ) to SETUP Mapping

| SETUP Information Element | routeReq( ) Method |
|---|---|
| Redirecting party BCD number | redirectingAddress |
| Redirecting party sub-address | redirectingAddress (TpAddress) SubAddressString |
| LLC repeat indicator | No mapping |
| Low layer Compatibility I | No mapping |
| Low layer Compatibility II | No mapping |
| HLC repeat indicator | No mapping |
| High layer Compatibility I | No mapping |
| High layer Compatibility II | No mapping |
| User-user | No mapping |
| Priority | No mapping |
| Alert | appInfo (TpCallAppInfo) CallAppAlertingMechanism |
| Network Call Control Capabilities | No mapping |
| Cause of No CLI | No mapping |

Figure 5:
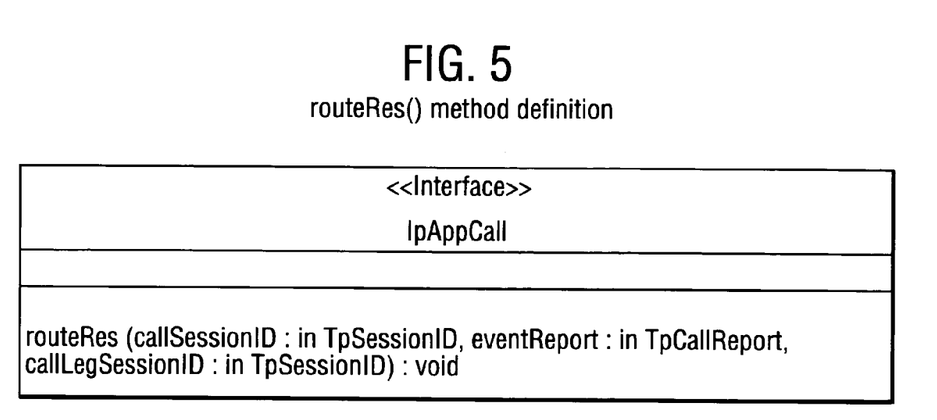
FIG. 5 is a diagram illustrating routeRes( ) structure.

The routeRes( ) method-and the data types of the parameters are defined in Third Generation Partnership Project 3GPP technical specification TS 29.198-04 and are as shown in FIG. 5.

Table 2 presented below shows the mapping (i.e. translation) from the mobile application part (MAP) operation "CCBS (call completion to busy subscriber) remote user free RUF Ack" to the Open Service Architecture (OSA) application programming interface (API) method routeRes( ) parameters and data types.

TABLE 2

Mobile application part (MAP) CCBS (call completion to busy subscriber)

| Multiple application part MAP CCBS RUF Ack (RemoteUserFreeRes) | routeRes |
|---|---|
| No Mapping | callSessionID |
| Ruf-Outcome | EventReport CallReportType |
| accepted (0), | P_CALL_REPORT_UNDEFINED |
| rejected (1), | P_CALL_REPORT_ROUTING_ FAILURE |
| noResponseFromFreeMS (2), - T4 Expiry | P_CALL_REPORT_NO_ANSWER |
| noResponseFromBusyMS (3), - T10 Expiry | P_CALL_REPORT_NO_ANSWER |
| udubFromFreeMS (4), | P_CALL_REPORT_BUSY |
| udubFromBusyMS (5), | P_CALL_REPORT_BUSY |
| No Mapping | CallLegsessionID |
| extensionContainer | No Mapping |

Call Report to Open Service Architecture (OSA) routeRes( ) Mapping

Table 3 presented below shows the mapping (i.e translation) from the mobile application part MAP operation "CCBS (call completion to busy subscriber) Call Report" to the Open Service Architecture OSA application programming interface API method routeRes( ) parameters and data types.

TABLE 3

Mobile application part MAP CCBS (call completion to busy subscriber) Call Report to Open Service Architecture OSA routeRes( ) Mapping

| Multiple application part MAP CCBS Call Report (StatusReportArg) | routeRes |
|---|---|
| No Mapping | callSessionID |
| Imsi | No Mapping |
| EventReportData | No Mapping |
| callReportData | EventReport |
| callOutcome | CallReportType |
| success (0) | P_CALL_REPORT_ANSWER |
| failure (1) | P_CALL_REPORT_ROUTING_FAILURE |
| busy (2) | P_CALL_REPORT_BUSY |
| extensionContainer | No Mapping |
| No Mapping | CallLegsessionID |

Network Architecture

An overview of the network architecture is shown in FIG. 2 as described previously. FIG. 2 shows the functional network entities involved, and identifies where new processing was required. As is depicted, new processing was required only on centralized entities in the network, i.e. the Open Service Architecture (OSA) service capability server (SCS) and the home location register (HLR), minimizing the impact on the network (i.e. the mobile switching centre (MSC)/visitor location register (VLR)) and its operations (i.e. the network initiated mobile originated (NIMO) procedure).

The Open Service Architecture (OSA) application that makes use of the application initiated call functionality is executed on the Open Service Architecture (OSA) Application Server. The Open Service Architecture (OSA) Application Server communicates with the Open Service Architecture (OSA) Service Capability Server, over the Open Service Architecture (OSA) application programming interface (API)interfaces. The mobile subscriber is served by an mobile switching centre (MSC) that supports the CCBS (call completion to busy subscriber) network initiated mobile originated (NIMO procedure (Network Initiated Mobile Originated). No control software updates are required for the mobile switching centre MSC/visitor location register VLR or for the network initiated mobile originated (NIMO) procedure.

From the point of view of the Open Service Architecture (OSA)Application Server, it is irrelevant that the CCBS (call completion to busy subscriber) procedures are being used to realize the functionality for the Open Service Architecture (OSA) createCall( ) method. The Open Service Architecture (OSA) application is not concerned with details of network functionality. From the point of view of the mobile switching centre (MSC)/visitor location register (VLR), it is irrelevant that the CCBS (call completion to busy subscriber) message exchange over the mobile application part (MAP) interface is required to support Open Service Architecture (OSA) application initiated calls. As far as the mobile switching centre (MSC)/visitor location register (VLR) is concerned, it is engaged in normal CCBS (call completion to busy subscriber) processing, i.e. the modifications in the home location register (HLR) and the Open Service Architecture (OSA) service capability server (SCS) have no impact on the rest of the network entities.

In this case, the fact that application initiated calls can only be setup by the application somewhat restricts the possible applications that can be deployed. The application can setup the call, but has no further control over it. This is known as monitor mode whereby events pertaining to a call in progress can be monitored (in particular by receiving event notifications) but not influenced. This is often acceptable, for instance for setting up large numbers of pushed advertisement calls where an announcement is played to the subscribers.

Including Application Control After Call Setup Where Supporting Open Service Architecture (OSA) Application Initiated Calls in CAMEL Phase 1 Phase 2 or Phase 3 Networks.

The mechanism described above supports application initiated calls, where the application can only set up the call, but not exercise any control over it during the lifetime of that call. This limited functionality is caused by the fact that the home location register (HLR) cannot control a call; the home location register (HLR) can only request its setup In order to perform subsequent control over the call, the switch (i. e mobile switching centre (MSC)) needs to be involved in the process.

The idea underlying the further system now described is basically to make use of the existing remote user free (RUF) and network initiated mobile originated (NIMO) procedures of the CCBS (call completion to busy subscriber) service for setting up application initiated calls and also to make use of existing CAMEL procedures to perform subsequent control over the call.

Figure 6:
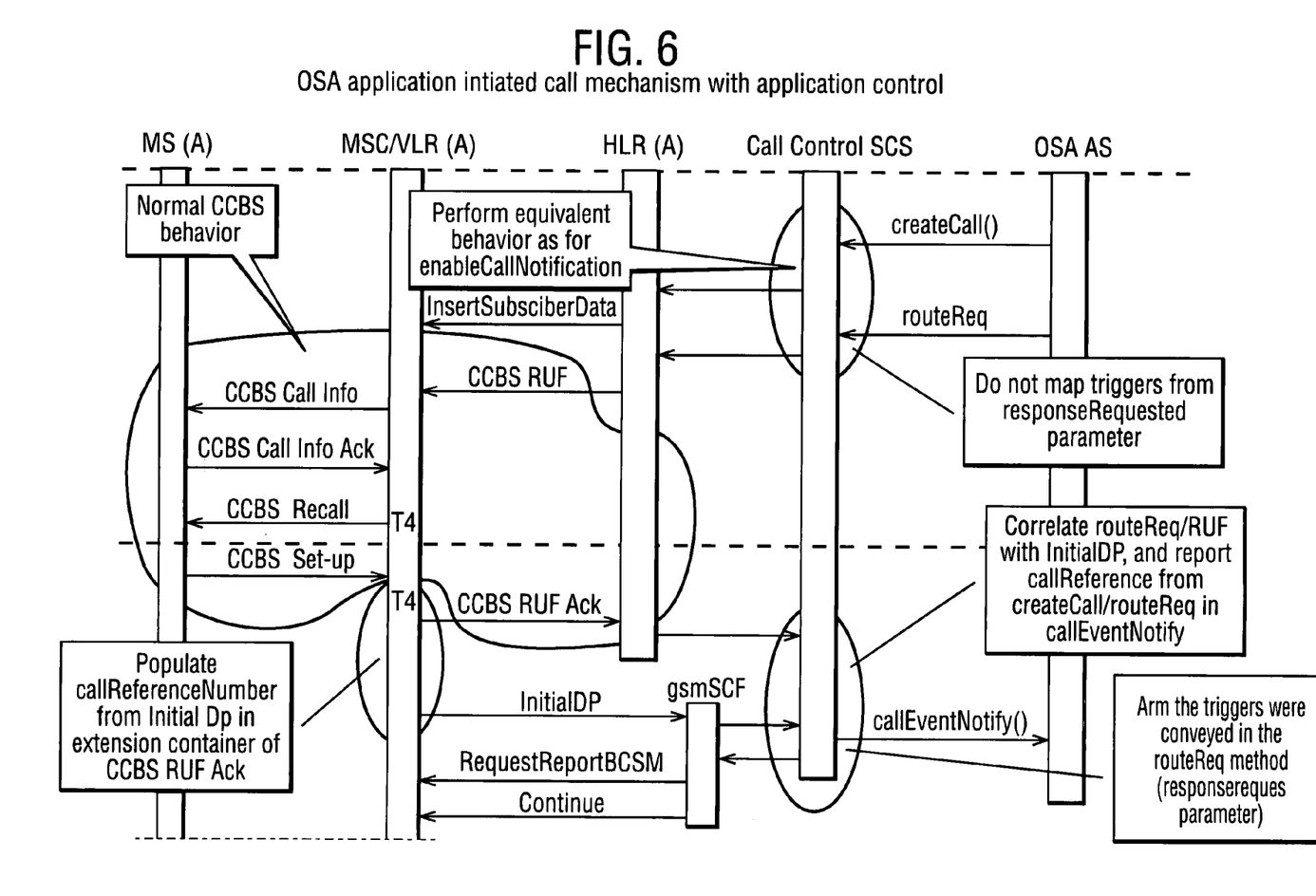
FIG. 6 is a diagram illustrating messaging in Open Service Architecture (OSA) application initiated call setup with application control after call setup.

The mechanism is depicted below in FIG. 6. For control over the call initiated by an Open Service Architecture (OSA) application, the served subscriber (i.e. to whom the call is being made) needs to be provisioned with CAMEL Subscription Information (CSI). Generally, CAMEL subscription information (CSI) is part of the subscriber data that is stored in the home location register (HLR) of the user's home network and several CSIs may exist for a CAMEL subscriber as documented in 3GPP TS 23.078. For our purposes, two CSIs are relevant, namely the Originating CAMEL subscription information CSI (O-CSI) and the Dialled Services CAMEL subscription information CSI (DS-CSI). The CAMEL subscription information CSI associated with a mobile originated call (O-CSI and the DS -CSI) are transferred from the home location register (HLR), during the location update procedure, to the visited mobile switching centre (VMSC)/visitor location register (VLR) associated with the area in which the subscriber is currently located. Associated with each CAMEL subscription information CSI are the criteria that have to be fulfilled and for every call attempt by a subscriber, these CAMEL subscription information (CSI) are checked to determine if CAMEL interaction should take place. In the context of Open Service Architecture (OSA), CAMEL messages are translated to methods (i.e messages) in the Call Control Service Capability Feature (as described in the 3GPP technical report TR 29.998).

The application does not explicitly arm a trigger in the network to be notified of call origination attempts (as would be achieved by invoking say an enableCallNotification method). Rather, the application requests the creation of a call object in the Call Control service capability server (SCS), by invoking the createCall method. As a result, a callReference is returned. The application then invokes the routeReq method to request the call to be setup in the network. The responseRequested parameter is populated with event detection points of which the application would like to be notified for the remainder of this call, and the Call Control service capability server (SCS) temporarily stores these event detection points. At this point the Call Control service capability server (SCS) perform the behaviour-equivalent of a enableCallNotification method in order to arm a trigger in the network, without that method actually being invoked. This way, the application does not need to be aware of the CCBS (call completion to busy subscriber) solution to setting up application-initiated calls.

In order to ensure that the application can subsequently control the call, the necessary CAMEL triggers need to be set. If the served subscriber is not currently provisioned with an O-CSI or a DS-CSI, the home location register (HLR) needs to create a temporary 'pseudo' O-CSI or DS-CSI for the user, which is only valid until the Open Service Architecture (OSA) application initiated call is established. This temporary 'pseudo' CAMEL subscription information CSI (DS-CSI or O-CSI) is sent to the Visited mobile switching centre (MSC) from the home location register (HLR) using a mobile application part (MAP) operation Insert Subscriber Data. The mobile switching centre (MSC)/visitor location register VLR-A is not aware about the temporary nature of the 'pseudo' CAMEL subscription information CSI. The home location register (HLR) subsequently requests the mobile switching centre (MSC)/visitor location register VLR-A to delete this 'pseudo' CAMEL subscription information (CSI) after the Open Service Architecture (OSA) initiated call has been established.

If the served subscriber is already provisioned with an O-CSI or DS-CSI, then the home location register (HLR) needs to check if any updates to the CSIs are required to ensure subsequent triggering for the Open Service Architecture (OSA) initiated call. If updates to the CAMEL subscription information CSI are required, then the home location register (HLR) informs the mobile switching centre (MSC)/visitor location register VLR-A using the existing mobile application part (MAP) Insert Subscriber Data operation. If no updates are required no such action is taken.

In a separate parallel process, the routeReq method is mapped to the "CCBS (call completion to busy subscriber) Remote User Free (RUF)" mobile application part (MAP) operation, as described previously above. As per currently standardised CCBS (call completion to busy subscriber) call processing, the terminal of subscriber A sends a CCBS (call completion to busy subscriber) Set-up message to the mobile switching centre (MSC)/visitor location register VLR-A. This SETUP message results in a "CCBS (call completion to busy subscriber) remote user free (RUF) Ack" mobile application part (MAP) operation (i.e message) to the home location register (HLR). When the SETUP message is received at the mobile switching centre (MSC)/visitor location register VLR-A, the CSIs for the served subscriber are checked and the result here is that CAMEL procedures are invoked (since as described earlier the home location register (HLR) ensured that this would take place by verifying the CSIs). This results in an initial detection point "InitialDP" CAMEL application part (CAP) operation to a global-system-for-mobiles service control function gsmSCF (acting as the Open Service Architecture (OSA) gateway). Processing is required in the mobile switching centre (MSC)/visitor location register VLR-A in order to map the callReferenceNumber field of the "InitialDP" into a field (specifically the extensionContainer parameter) of the "CCBS (call completion to busy subscriber) remote user free (RUF) Ack" so that they match. This will allow the Call Control service capability server (SCS) later on to correlate these two messages. The home location register (HLR) then forwards a message to the Call Control service capability server (SCS) as a result of the "CCBS (call completion to busy subscriber) remote user free (RUF) Ack" and then a global-system-for-mobiles service control function gsmSCF forwards a message to the Call Control service capability server (SCS) as a result of the "InitialDP". The initial detection point "InitialDP" indicates that the application may have further control over the call (e.g. to re-route the call under No Answer or Busy conditions).

As explained in the last paragraph, the Call Control service capability server (SCS) correlates the two messages and as the fields match hence deduces that the initial detection point "InitialDP" was fired for the application-initiated call. The Call Control service capability server (SCS) will then invoke the callEventNotify method (as a result of the initial detection point "InitialDP" and the CCBS (call completion to busy subscriber) remote user free (RUF) Ack messages including the same callReferenceNumber) so as to notify to the application that the application has full control over the call. To do this the Call control service capability server (SCS) must use the callReference parameter of the call process that was already created in the Call Control service capability server (SCS) from the initial createCall. (For comparison, normal Call Control service capability server (SCS) behaviour, according to Third Generation Partnership Project 3GPP technical specification TS 29.198-04, would have been to create instead a new call process once an initial detection point "InitialDP" is received.)

To control the call, the Call Control service capability server (SCS), by means of a message, instructs the a global-system-for-mobiles service control function gsmSCF to send a CAMEL application part CAP "RequestReportBSCM" message, (where BSCM denotes basic call state model), so as to enable notification to the application of subsequent events in processing the call at the mobile switching centre (MSC). A CAMEL application part (CAP) "Continue" operation or CAMEL application part (CAP) "connection" operation may then follow. A CAMEL application part (CAP) "continue" operation is to allow the call to proceed with the original setup parameters. A CAMEL application part (CAP) "connection" operation is to modify the destination address of the call (e.g. for rerouting).

This approach, where an application-initiated call can subsequently also be controlled by the application, is suited to, for example, a wake-up/alarm call application, where it is important that the application has the ability to perform alternative behavior in case the call is not terminated at the B subscriber, e.g. to perform re-direction in the case of a Busy or No Answer message being returned.

We claim:

1. A method of setting up a call connection to a mobile station operative to communicate with a Customised Application for Mobile Enhanced Logic CAMEL telecommunications network, the call being initiated by an Open Service Architecture, OSA application causing a message to be produced which indicates to the network that the mobile station is now available to make a ring back call connection, the network setting up the call connection in response to the message.

2. A method according to claim 1, in which the message is a Completion of Calls to Busy Subscriber CCBS Remote User Free RUF message.

3. A method according to claim 1 or claim 2, in which the network sets up the call connection using Completion of Calls to Busy Subscriber CCBS network-initiated mobile-originated NIMO procedures.

4. A method according to claim 3, in the network comprising a home location register HLR of the mobile station and a visited mobile switching centre VMSC/visited location register VLR with which the mobile station is currently associated, the home location register HLR constructs the message, and instructs the visited mobile switching centre VMSC/visited location register VLR to make a Completion of Calls to Busy Subscriber CCBS Re-call so as to setup the call connection in response to the message.

5. A method according to claim 1 or claim 2, in the network comprising a home location register HLR of the mobile station and a visited mobile switching centre VMSC/visited location register VLR with which the mobile station is currently associated, the home location register HLR constructs the message, and instructs the visited mobile switching centre VMSC/visited location register VLR to make a Completion of Calls to Busy Subscriber CCBS Re-call so as to setup the call connection in response to the message.

6. A method of controlling a call to a mobile station operative to communicate with a Customised Application for Mobile Enhanced Logic CAMEL telecommunications network comprising the method of setting up the call connection according to claim 1, and the OSA application controlling the call connection after call connection setup.

7. A method according to claim 6, in which the home location register HLR or visited mobile switching centre VMSC/visited location register VLR with which the mobile station is currently associated is provided with CAMEL subscription information CSI so as to enable said controlling the call connection after call connection setup.

8. A method according to claim 7 in which the home location register updates the visited mobile switching centre VMSC/visited location register VLR with CAMEL subscription information CSI, in the absence of which pseudo—CAMEL subscription information CSI is sent instead which is deleted upon the call connection being set up.

9. A method according to claim 7 or claim 8, in which the visited mobile switching centre VMSC/visited location register VLR is operative to check the CAMEL subscription information CSI or pseudo—CAMEL subscription information CSI and if the information is found acceptable an initial detection point InitialDP is sent to a call control server including an identifier that the OSA application may have control over the call connection.

10. A method according to claim 9, in which the visited mobile switching centre VMSC/visited location register VLR responds to the message by sending to the call control server an acknowledgement including an identifier field which matches that in the initial detection point, the server being operative to check whether the two identifiers match and if so notify the OSA application of its control of the call connection after call connection setup.

11. A wireless telecommunications system comprising a Customised Application for Mobile Enhanced Logic CAMEL telecommunications network, and a mobile station, the network being operative to set up a call connection to the mobile station, the call being initiated by an Open Service Architecture OSA application causing a message to be produced which indicates to the network that the mobile station is now available to make a ring back call connection, the network being operative to set up the call connection in response to the message.

* * * * *